A. W. TOWLE.
AUTOMOBILE WIND SHIELD.
APPLICATION FILED OCT. 2, 1908.
942,225.
Patented Dec. 7, 1909.
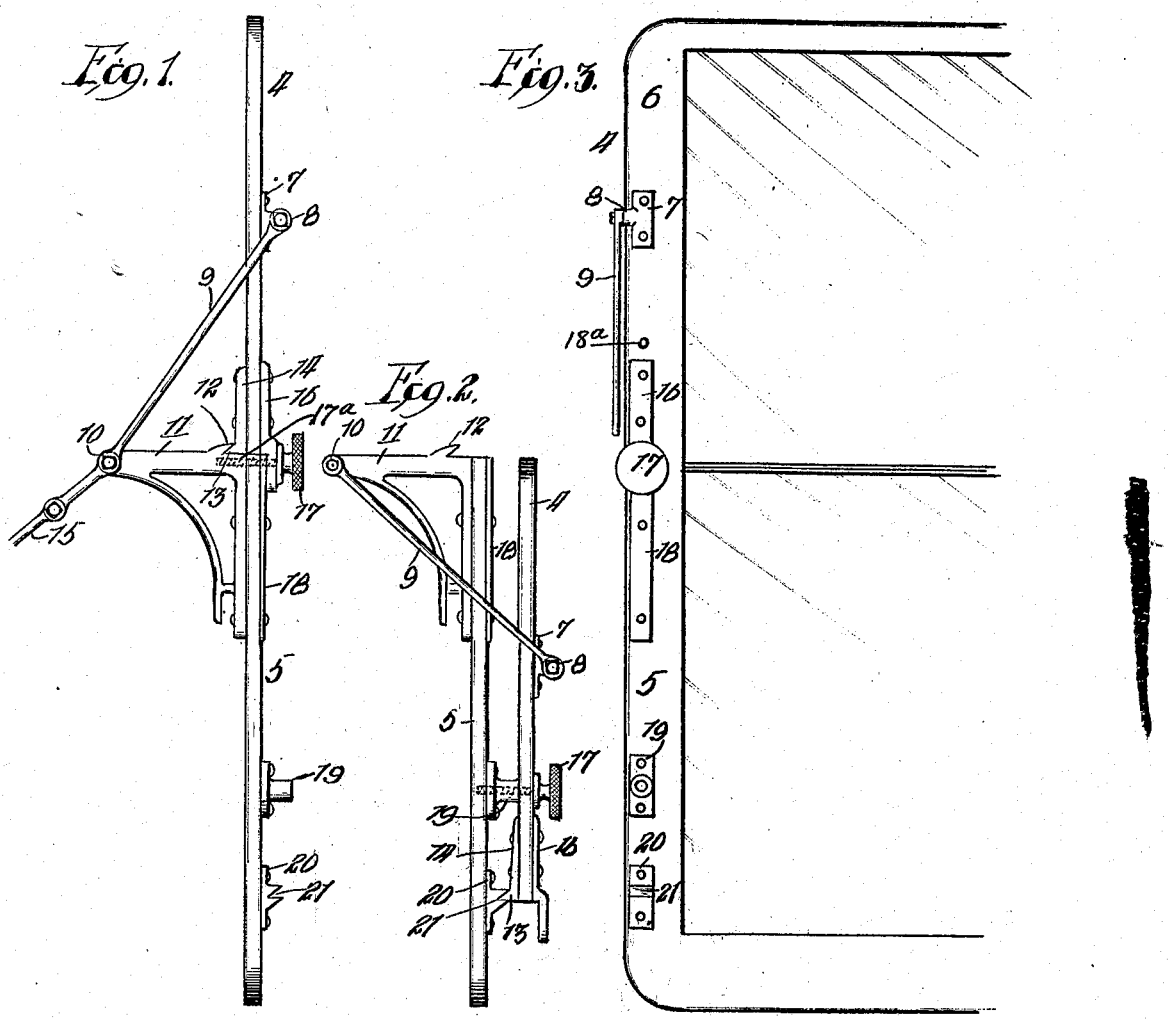

UNITED STATES PATENT OFFICE.

AMOS W. TOWLE, OF CHICAGO, ILLINOIS, ASSIGNOR OF ONE-HALF TO PETER WENDEL AND ONE-HALF TO PETER WENDEL, TRUSTEE, OF CHICAGO, ILLINOIS.

AUTOMOBILE WIND-SHIELD.

942,225.  Specification of Letters Patent.  Patented Dec. 7, 1909.

Application filed October 2, 1908. Serial No. 455,855.

*To all whom it may concern:*

Be it known that I, AMOS W. TOWLE, a citizen of the United States, residing at Chicago, in the county of Cook and State of Illinois, have invented certain new and useful Improvements in Automobile Wind-Shields, of which the following is a specification.

The present invention relates to an improved wind shield especially adapted for use upon automobiles and vehicles generally, for the purpose of shielding the occupants from wind, rain and snow, when traveling.

It is the essential object to provide a device that will be comparatively easy to manipulate and extremely simple in construction, none of its parts projecting above the shield when in lowered position.

The invention consists in the features of construction and combination of parts hereinafter described and claimed.

In the drawings, Figure 1 is a side elevation of this improved vehicle wind shield, in raised position; Fig. 2 a similar view, the upper adjustable section thereof being in lowered locked position; and Fig. 3 a rear elevation, showing the position and arrangement of the respective parts of the device as attached to the opposite sides of the wind shield frame.

This improved vehicle wind shield comprises an upper movable section 4 and a lower fixed section 5, the bodies of which are usually made of glass incased within suitable frames 6, the same being positioned transversely across the front of the body of the vehicle frame.

Although but one side or edge of the vehicle wind shield is illustrated, it is to be understood that there is a corresponding arrangement of parts on the opposite inner side thereof.

Secured upon the side frames of the wind shield 6, and upon the upper movable section 4 thereof, is a plate 7 having its finger 8 extending slightly beyond the outer edge of the frame for receiving the upper end of a movable rod or bar 9, which has its lower end positioned upon a similar finger 10, which is formed integrally with a bracket or brace 11 of the usual formation, secured upon the outer side of the vehicle wind shield, and having an upturned edge 12 forming a suitable recess for receiving the toothed edge 13 at the lower end of the supporting bar 14, as indicated in Fig. 1. A stay rod 15 is connected with the bracket 11 at its upper end; and its lower end is secured to the vehicle body, as usual.

Upon the inner side of the frame, and secured to its upper movable section 4, is a plate 16 having an enlarged lower end for receiving an adjustable thumb screw 17, which has its threaded shank in engagement with an aperture 17ª in the body of the bracket 11, as indicated in Fig. 1. A similar metallic plate 18 is secured to the frame of the wind shield upon the lower fixed section 5 adjacent to the plate 16. Upon the frame, below the metallic plate 18, is a threaded socket member 19 for receiving and engaging the shank of the adjustable thumb screw 17, when the upper adjustable section is in its lowermost position, as indicated in Fig. 2; and a retainer 20, having a transverse opening 21, corresponding to the shape of the toothed edge 13 of the supporting bar 14, is adapted to receive and lock the upper adjustable section 4, in the position shown in Fig. 2, when the adjustable thumb screw 17 engages the aperture 18ª and the socket member 19.

In use, this device is normally in the raised position shown in Fig. 1, but when it is desired, for any reason, to lower the same, the thumb screws 17 are first released on both sides of the frame, after which the upper section is moved backward a distance sufficient to be lowered to the position indicated in Fig. 2, whereupon the upper section is securely locked to the fixed lower section when the thumb screws 17 are in engagement with the socket members 19. This construction enables the shield to be fixed in desired position with a minimum of labor, all unnecessary brass finishings being eliminated, so that, when the upper adjustable section is lowered, no part of the shield will project appreciably above the lower fixed section thereof.

What I claim as new and desire to secure by Letters Patent is:

A vehicle wind shield comprising an upper adjustable section and a lower fixed section, a brace secured to the outer side of the lower fixed section and having a toothed edge for receiving a toothed brace on the upper adjustable section, rods pivotally connected to the brace and to the upper adjustable section, and adjustable thumb screws carried by plates on the upper movable section, adapted to engage apertures formed in the brace when in raised position, and for engaging sockets on the lower section for locking the shield in lowered position, the toothed braces engaging toothed retainers on the lower section, substantially as described.

AMOS W. TOWLE.

Witnesses:
 PETER WENDEL,
 CHARLES B. McCOY,
 WALKER BANNING.